(12) United States Patent
Roat

(10) Patent No.: US 11,724,737 B2
(45) Date of Patent: Aug. 15, 2023

(54) HYBRID STEERING SYSTEM AND METHOD IMPLEMENTING VIRTUAL AND MECHANICAL STOPS

(71) Applicant: Caterpillar Inc., Peoria, IL (US)

(72) Inventor: Kenneth Marvin Roat, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 630 days.

(21) Appl. No.: 16/870,217

(22) Filed: May 8, 2020

(65) Prior Publication Data

US 2021/0347411 A1  Nov. 11, 2021

(51) Int. Cl.
*B62D 15/02* (2006.01)
(52) U.S. Cl.
CPC ....... *B62D 15/0215* (2013.01); *B62D 15/025* (2013.01); *B62D 15/0205* (2013.01)
(58) Field of Classification Search
CPC ............ B62D 15/0215; B62D 15/0205; B62D 15/025; B62D 5/005; B62D 5/0469; B62D 5/006; B62D 12/00
See application file for complete search history.

(56) References Cited

U.S. PATENT DOCUMENTS

| | | | |
|---|---|---|---|
| 5,230,397 A * | 7/1993 | Tranchon | B62D 5/0412 180/444 |
| 6,250,419 B1 * | 6/2001 | Chabaan | B62D 6/10 180/443 |
| 6,293,366 B1 * | 9/2001 | Chabaan | B62D 5/0463 180/443 |
| 6,389,343 B1 | 5/2002 | Hefner et al. | |
| 6,425,454 B1 * | 7/2002 | Chabaan | B62D 5/0463 180/443 |
| 6,598,695 B1 | 7/2003 | Menjak et al. | |
| 6,651,771 B2 * | 11/2003 | Chabaan | B62D 6/10 701/42 |
| 6,899,196 B2 | 5/2005 | Husain et al. | |
| 6,926,112 B2 | 8/2005 | Husain et al. | |
| 7,881,841 B2 | 2/2011 | Dattilo et al. | |
| 9,409,588 B2 * | 8/2016 | Sintorn | B62D 1/02 |
| 2002/0108804 A1 | 8/2002 | Park | |

(Continued)

FOREIGN PATENT DOCUMENTS

| | | |
|---|---|---|
| DE | 32 46 137 C2 | 2/1985 |
| FR | 2 783 486 B1 | 6/2002 |
| JP | 2014133534 A | 7/2014 |

OTHER PUBLICATIONS

Written Opinion and International Search Report for Int'l. Patent Appln. No PCT/US2021/030543, dated Sep. 23, 2021 (16 pgs).

*Primary Examiner* — Russell Frejd
(74) *Attorney, Agent, or Firm* — Xsensus, LLP

(57) ABSTRACT

A steering system and method can determine one or more position-related characteristics of a steering column of a machine, determine that the one or more position-related characteristics indicate that a resistive force is to be applied to the steering column, and control operation of an electric motor to apply the resistive force to the steering column, wherein a mechanical stop (e.g., a progressive mechanical stop) can be provided to restrict rotation of the steering column. One or more virtual stops may be set to limit rotation of the steering column by way of controlling the operation of the electric motor to apply the resistive force.

20 Claims, 4 Drawing Sheets

(56) References Cited

U.S. PATENT DOCUMENTS

| | | | |
|---|---|---|---|
| 2004/0055810 A1* | 3/2004 | Chabaan | B62D 6/10 |
| | | | 180/446 |
| 2009/0200097 A1* | 8/2009 | Farber | B66F 9/10 |
| | | | 180/443 |
| 2011/0320090 A1* | 12/2011 | Barthomeuf | B60W 40/12 |
| | | | 701/42 |
| 2013/0151081 A1* | 6/2013 | Delarche | B62D 5/0484 |
| | | | 701/42 |
| 2018/0201303 A1* | 7/2018 | Hara | B62D 15/0235 |
| 2019/0031229 A1* | 1/2019 | Sakaguchi | B62D 5/0463 |
| 2020/0086911 A1 | 3/2020 | Stahl | |

* cited by examiner

HYBRID STEERING SYSTEM AND METHOD IMPLEMENTING VIRTUAL AND MECHANICAL STOPS

TECHNICAL FIELD

The present disclosure relates to electronic or steer-by-wire steering, and more particularly to electronic or steer-by-wire steering systems and methods that provide or implement at least one virtual stop and mechanical stop pairing.

BACKGROUND

Conventional electronic steering may use a position sensor to detect rotational position of a steering wheel of a machine. Steering wheel rotation can cause the position sensor to output a position signal to an actuating device (e.g., a microprocessor that controls a hydraulic pump), which can then cause the wheels of the machine to rotate in correspondence with the steering wheel rotation.

A mechanical stop may be coupled to a steering column of the steering wheel to prevent movement beyond a particular angle from the "straight ahead" or "zero-angle" position of the steering wheel. However, metal-to-metal contact between the mechanical stop and the steering column can occur, which may result in undesirable sound and/or tactile feedback to the operator. A compliant member can be provided for the mechanical stop but may limit or consume an excess amount of angular rotation for the steering wheel, which is particularly undesirable in the context of steering wheels already limited in rotational range to three hundred sixty degrees or less.

U.S. Pat. No. 6,389,343 ("the '343 patent") describes an apparatus and methods for controlling the resistance to the movement of a steering shaft that is operable to move as a function of an operator input. A position sensor is coupled with the steering shaft and transmits a shaft position signal as a function of the position of the steering shaft, and a processing device is coupled with the position sensor to receive the shaft position signal and transmit a resistance signal as a function of the shaft position signal. A resistance device is coupled with the steering shaft and with the processing device to receive the resistance signal. According to the '343 patent, the resistance device resists the movement of the steering shaft as a function of the resistance signal.

SUMMARY OF THE DISCLOSURE

In one aspect, the present disclosure implements a steering method. The steering method can comprise receiving, using a processor, position signals associated with rotational position of a steering column, the steering column having a mechanical stop operatively provided to mechanically limit rotation of the steering column to a first range of rotation; determining, using the processor, at least one position-related characteristic of the steering column based on the received position signals; determining, using the processor, that the determined at least one position-related characteristic indicates that a resistive force is to be applied to the steering column; and controlling, using the processor, operation of an electric motor to apply the resistive force to the steering column responsive to said determining that the determined at least one position-related characteristic indicates that the resistive force is to be applied to the steering column.

In another aspect, the present disclosure implements or provides a non-transitory computer-readable storage medium storing computer-readable instructions that, when executed by a computer, cause the computer to perform a steering method. The steering method can comprise determining a plurality of position-related characteristics of a steering column of a working machine, the plurality of position-related characteristics including rotational positioning of the steering column and rotation speed of the steering column; dynamically setting a virtual stop to limit rotation of the steering column based on said determining the plurality of position-related characteristics of the steering column, the steering column having a progressive mechanical stop operatively provided to mechanically limit rotation of the steering column past the virtual stop; and implementing the dynamically set virtual stop by applying a resistive force to the steering column via control of an electric motor when the steering column is at a position within an operational range of the progressive mechanical stop.

In yet another aspect a steering system for a working machine can be provided or implemented. The steering system can comprise a control interface to receive an input to control steering of the working machine; a steering column operatively coupled to the control interface and a steering assembly to control steering of the working machine based on the input; a progressive mechanical stop operatively coupled to the steering column to mechanically limit rotation of the steering column to a first range of rotation; an electric motor operatively coupled to the steering column to apply a resistive force to the steering column; at least one position sensor operatively coupled to the steering column to signal rotational position of the steering column; and a controller operatively coupled to the electric motor and the at least one position sensor to output control signals to the electric motor to apply the resistive force to the steering column based on the rotational position of the steering column. The controller, via the control signals to the electric motor, can provide virtual end stops to further limit rotation of the steering column to a second range of rotation within the first range of rotation, and the electric motor can apply the resistive force to the steering column from a state where no resistive force is applied to the steering column responsive to the control signals.

Other features and aspects of this disclosure will be apparent from the following description and the accompanying drawings.

DETAILED DESCRIPTION

The present disclosure relates to electro-hydraulic (EH) steering systems and methods, and more particularly to EH steering systems and methods that provide or implement at least one virtual stop and mechanical stop pairing. EH steering systems may be known or referred to as a steer-by-wire steering systems.

Figure 1:
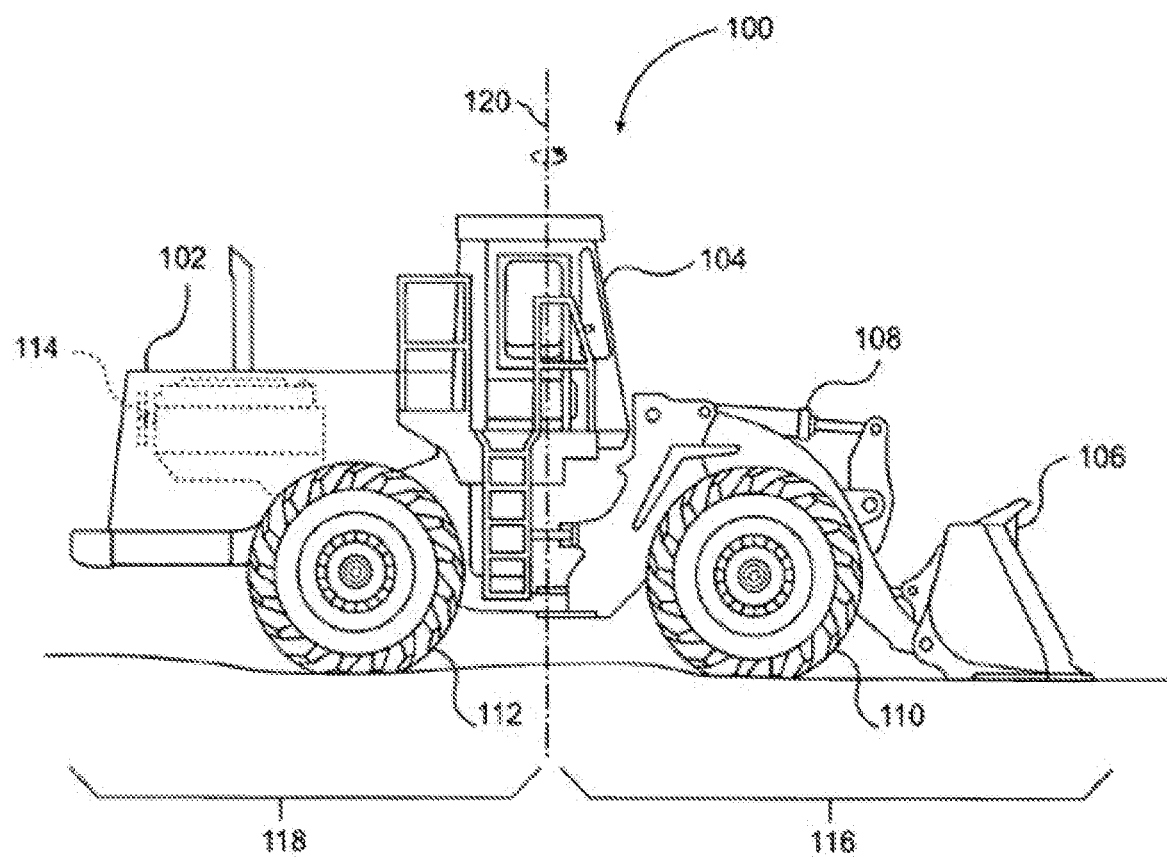
FIG. 1 is an illustration of an exemplary machine according to one or more embodiments of the disclosed subject matter.

Referring now to the drawings, FIG. 1 illustrates a side view of a machine 100 according to embodiments of the disclosed subject matter. The machine 100, which may be a work machine, can incorporate an electro-hydraulic steering system as disclosed herein.

The machine 100 may include an engine housing 102, an operator station 104, and a work implement 106, such as a bucket for digging and loading material. In the example of machine 100 being a wheel loader, the work implement 106 can be powered and controlled by a number of actuators, including a tilt actuator 108. The machine 100 may include front and rear ground engaging devices, such as front wheels 110 and rear wheels 112 that support the machine 100. The engine housing 102 may include a power source, such as an engine 114, that may provide power to the front and/or rear wheels 110, 112.

To drive the machine 100, an operator may manipulate one or more control interfaces (e.g., a steering wheel) that may be housed within the operator station 104. The control interface(s) may ultimately steer the machine 100 by extending and retracting hydraulic steering actuators or cylinders (not shown). In the example of machine 100 being a wheel loader, the machine 100 may include a front end 116 and a back end 118. The hydraulic steering actuators may extend between the front and back ends 116, 118 to articulate the front end 116 relative to the back end 118 about an articulation axis 120. Though the electro-hydraulic steering system is discussed with reference to an articulating work machine, the principles, systems, and methods described herein can be equally applicable to a more conventional electro-hydraulic steering system that turns the wheels relative to the machine body to steer the machine. Thus, embodiments of the disclosed subject matter can involve machines in the form of wheel loaders, trucks, motor graders, etc.

Figure 2:
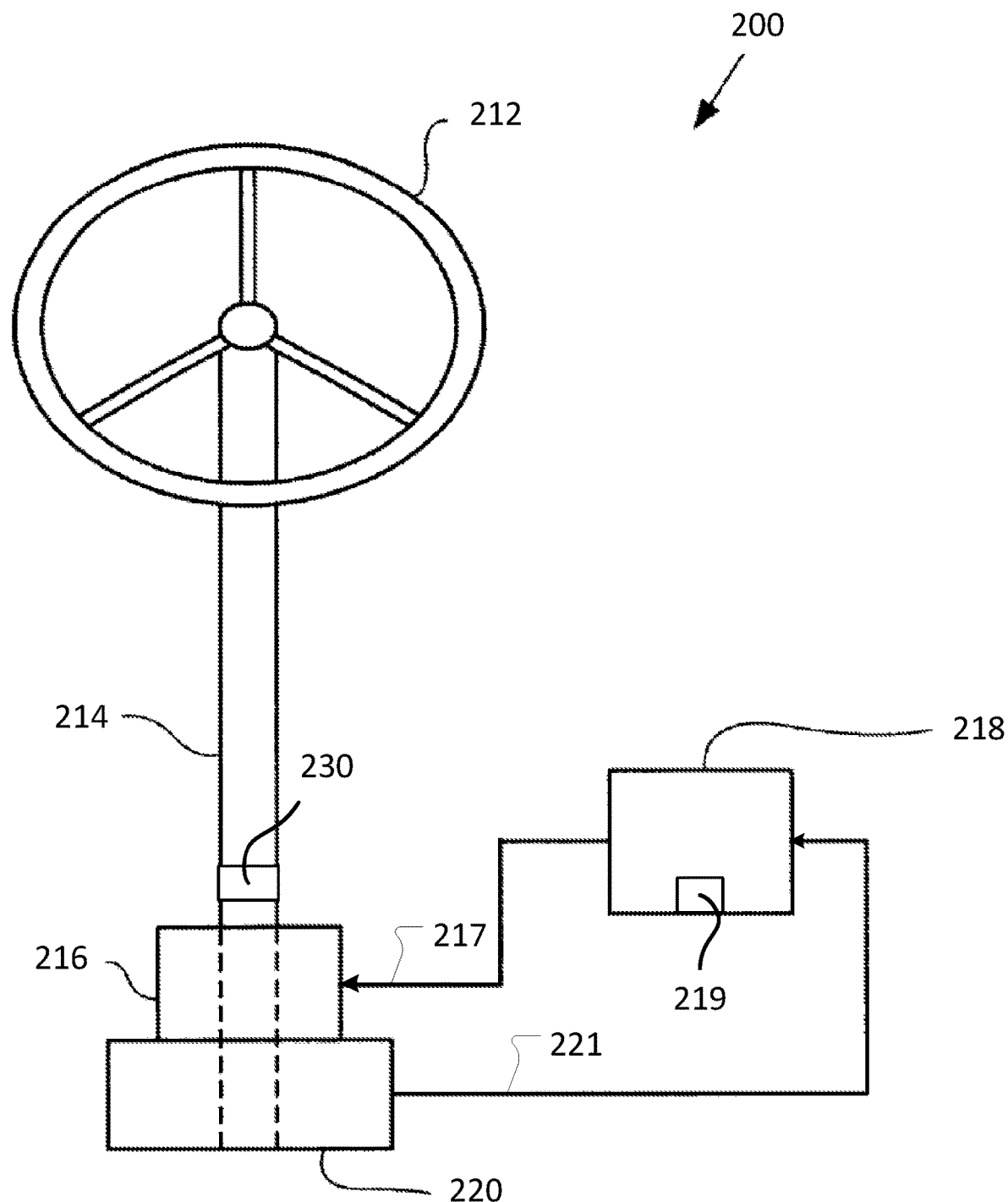
FIG. 2 is a functional block diagram of a steering system according to one or more embodiments of the disclosed subject matter.

Turning to FIG. 2, FIG. 2 is a functional block diagram of a steering system 200 according to one or more embodiments of the disclosed subject matter. The steering system 200 can be implemented in machines according to embodiments of the disclosed subject matter, such as the machine 100 shown in FIG. 1.

The steering system 200 can include a control interface 212, a steering column or shaft 214, one or more sensors 216, a controller 218, and an electric motor 220. The steering system 200 can also include one or more mechanical stops 230. The steering column 214 can be operatively coupled to the control interface 212 at one end and at an opposite end to a steering assembly, which may include a rack and pinion, tie rod, kingpin, etc. (not shown), to control steering of the machine 100. Generally, steering control can be responsive to an input to the control interface 212, which can control the steering column 214, under control of the controller 218.

The control interface 212 can be a steering input device, such as a steering wheel that moves as a function of an input from an operator of the machine 100, for instance. The steering input device, according to embodiments of the disclosed subject matter, is not limited to a steering wheel, and may take the form of a portion of a steering wheel, a steering yoke, a lever, or a graphical user interface (GUI), as non-limiting examples.

The sensor 216 can be a position sensor and, as such, can be operatively coupled to the steering column 214 to signal rotational position of the steering column 214. The sensor 216 in the form of a position sensor can be a rotary or linear position sensor, as non-limiting examples. As another example, the sensor 216 can be an angular or rotational speed sensor that senses angular or rotational speed of the steering column 214. As yet another example, the sensor 216 can be an encoder (or multiple encoders) that determines positioning of the electric motor 220, which can be used to determine positioning of the steering column 214.

The sensor 216 can output position signals 217 corresponding to rotational or angular position of the steering column 214 to the controller 218 as a function of the position of the steering column 214. As used herein, such position signals 217 can be true position signals or position-based signals (e.g., speed, acceleration, etc.) depending upon the type of sensor 216. As noted above, multiple sensors 216 can be implemented, where such sensors 216 can be the same type or different types (e.g., a position sensor and a speed sensor).

The electric motor 220, which may be a DC brushless motor as a non-limiting example, can be operatively coupled to the steering column 214 (e.g., around the steering column 214) to apply or provide a resistive force to the steering column 214. Application of the resistive force may also be characterized as providing torque feedback. Discussed in more detail below, the electric motor 220 may receive control signals 221 from the controller 218. Thus, the electric motor 220 can apply the resistive force to resist rotational movement of the steering column 214, for instance, as a function of or responsive to the control signals 221 from the controller 218. That is, when the steering column 214 receives an input from the control interface 212 to rotate in a first direction (e.g., clockwise) the electric motor 220 can apply the resistive force in a second direction opposite the first direction (e.g., counterclockwise) to resist the rotational movement in the first direction. The application of resistive force can be based on the current angular position of the steering column 214 and, optionally, a speed or velocity associated with the rotation of the steering column 214 in the first direction.

Each mechanical stop 230 can be operatively provided relative to the steering column 214 to constrain rotation of the steering column 214, and prevent rotational movement of the steering column 214 beyond a particular angle. Constraining rotation by the mechanical stop 230 can mean providing mechanical resistance to the steering column 214. The resistance can progressively and/or iteratively increase, for instance, linearly or in levels, until ultimately reaching a high enough resistance value to create a so-called hard mechanical stop past which the steering column 214 cannot be further rotated. Thus, according to embodiments of the disclosed subject matter, the mechanical stop 230 can be characterized as a progressive mechanical stop, wherein the mechanical stop 230 is activated by or engaged with the steering column 214 and provides an opposing resistive force (e.g., counterclockwise) opposing the rotation of the steering column 214 toward the hard mechanical stop (e.g., clockwise) that is progressively increased until the hard mechanical stop is reached. Likewise, the resistance applied by the progressive mechanical stop can decrease (e.g., progressively) when the steering column 214 is within the operational range of the progressive stop and the steering column 214 is rotated away from the hard mechanical stop (e.g., counterclockwise) toward a non-operational range of the progressive stop (i.e., when the mechanical stop 230 is not activated by or engaged with the steering column 214).

Non-limiting examples of mechanical stops 230 in the form of progressive mechanical stops according to embodiments of the disclosed subject matter include a spring operatively coupled to the steering column 214 and/or an assembly thereof, a compliant member (e.g., an elastomer covering) provided on the steering column 214 and/or an assembly thereof, and a friction device that uses friction to generate a resistive force (e.g., restricted in geometry to increase friction). Optionally, the mechanical stop 230 can be comprised of or consist of two of more mechanical stops 230, such as two or more of the foregoing exemplary progressive mechanical stops. Moreover, one or more mechanical stops 230 may be provided at and define a limit to a range of rotation for the steering column 214.

The controller 218 can be operatively coupled to the electric motor 220 and the sensor 216. The controller 218 can receive position signals 217 from the sensor 216 and output the control signals 221 based on the received position signals 217 to control the electric motor 220. More specifically, the control signals 221 can be output to the electric motor 220 based position-related characteristics of the steering column 214 as sensed by the sensor 216 at a single instance of time or at multiple instances of time. Additionally or alternatively, the control signals 221 can be based on angular or rotational speed of the steering column 214 at a single instance of time or at multiple instances of time. Depending upon the type of sensor 216 and the corresponding position signals 217 received by the controller 218, the controller 218 can determine some or all of the position-related characteristics of the steering column 214. For instance, in a case where the sensor 216 signals positioning of the steering column 214 the controller 218 may determine rotational speed, rotational acceleration, and/or direction of rotation of the steering column 214.

The controller 218 can use the position-related characteristics of the steering column 214 to determine whether to control the electric motor 220 to apply (or not) a resistive force to the steering column 214. The controller 218 can also use the position-related characteristics of the steering column 214 to determine how much resistive force to have the electric motor 220 apply to the steering column 214 and/or when to have the electric motor 220 apply the resistive force to the steering column 214. Thus, the controller 218 can generate the control signals 221 based on one or more determined position-related characteristics of the steering column 214 and further processing thereof.

Control of the electric motor 220, via the control signals 221, can include selectively operating the electric motor 220 to apply the resistive force to the steering column 214, as noted above. According to one or more embodiments, such control can be from a first state where the electric motor 220 does not apply any resistive force to the steering column 214 to a second state where the electric motor 220 begins applying the resistive force to the steering column 214. Optionally, the resistive force applied to the steering column 214, once initiated, can increase as the steering column 214 is moved toward the mechanical stop 230. For instance, the controller 218 can output control signals 221 to cause the electric motor 220 to increase the resistance to movement for the steering column 214 as the rotational speed of the steering column 214 increases or reaches a predetermined value. As another example, the controller 218 can output control signals 221 to cause the electric motor 220 to increase the resistance to movement for the steering column 214 as the steering column 214 approaches or reaches a particular rotational position. Discussed in more detail below, the particular rotational position can be defined by a predetermined or dynamically set virtual stop (e.g., virtual end stop). The increase in resistive force can be linear or non-linear, such as exponential, stepped, or pulsed.

The controller 218 may be or include processing circuitry or a processor (e.g., a microprocessor), where the processing circuitry or processor can process the position signals 217 from the sensor 216. As noted above, the processing of the position signals 217 can include determining position-related characteristics of the steering column 214, such as rotational speed and/or rotational acceleration.

Optionally, memory 219 can be implemented. Such memory 219 can be provided offboard and/or onboard the controller 218, such as shown in FIG. 2. The memory 219 can be configured to store, in a lookup table, for instance, one or more virtual stops (e.g., virtual end stops) to selectively control application of the resistive force by the electric motor 220. Such virtual stops can be stored in correlation with various position-related characteristics of the steering column 214, such as angular or rotational position of the steering column 214, angular or rotational position of the steering column 214 with respect to one or more of the mechanical stops 230, rotation speed of the steering column 214, rotational acceleration of the steering column 214, and/or direction of rotation of the steering column 214. The one or more virtual stops can be stored in the memory 219 in advance or dynamically as part of a learning process, for instance.

Figure 3:
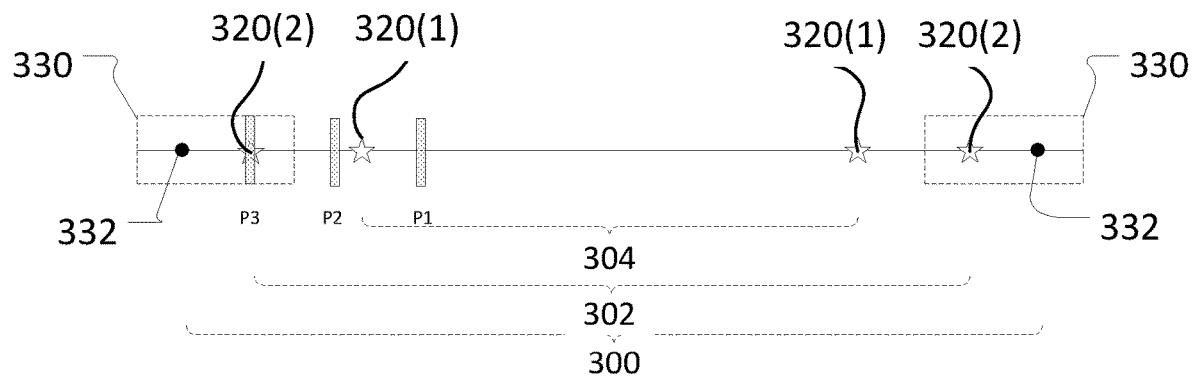
FIG. 3 is a diagrammatic representation showing steering ranges and steering stops according to one or more embodiments of the disclosed subject matter.

FIG. 3 is a diagrammatic representation showing steering ranges and steering stops according to one or more embodiments of the disclosed subject matter.

In this example, the horizontal line in FIG. 3 represents rotational position of the steering column 214, each star represents a virtual stop 320, and each of the dashed boxes represents a progressive mechanical stop 330 for the mechanical stop 230 of FIG. 2. Embodiments of the disclosed subject matter, however, are not limited to mechanical stops 230 in the form of progressive mechanical stops 330. Each dot associated with the progressive mechanical stops 330 represents a hard mechanical stop 332 of the progressive mechanical stop 330 past which the steering column 214 is mechanically prohibited from moving.

Rotation of the steering column 214 can be limited according to a first range of rotation 300. According to one or more embodiments, the first range of rotation 300 can be less than or equal to three hundred sixty degrees.

The progressive mechanical stops 330 can limit rotation of the steering column 214 according to the first range of rotation 300. For example, the hard mechanical stops 332 can define the first range of rotation 300 for the steering column 214, such as shown in FIG. 3. That is, the steering column 214 may be positioned, via the input to the control interface 212, anywhere between the hard mechanical stops 332 but not past either of the hard mechanical stops 332. Alternatively, the first range of rotation 300 for the steering column 214 can be defined inward of the hard mechanical stops 332, such as a position between the hard mechanical stop 332 and initiation of the progressive mechanical stop 330. Incidentally, the operational range of the progressive mechanical stop 330 can be defined from the hard mechanical stop 332 to initiation of the progressive mechanical stop 330. Optionally, the first range of rotation 300 may be characterized or defined based on whether or not any virtual stops 320 are set within the operational range of the progressive mechanical stop 330 from at or just before the hard mechanical stop 332 inward to at or just after initiation of the progressive mechanical stop 330.

Rotation of the steering column 214 can also be limited according to a second range of rotation 302. The second range of rotation 302 can be characterized or defined as between corresponding pairs of virtual stops 320. For instance, the second range of rotation 302 can be defined between the virtual stops 320(2) in FIG. 3. As another example, the virtual stops 320(1) can define the second range of rotation 302. In the former example, the range of rotation between the virtual stops 320(1) may then be characterized as a third range of rotation 304. To be clear, though FIG. 3 shows two pairs of virtual stops 320(1), 320(2), a pair of virtual stops may be comprised of or consist of only the virtual stops 320(1), only the virtual stops 320(2), only one of the virtual stops 320(1), only one of the virtual stops 320(2), or virtual stops in addition to virtual stops 320(1) and 320(2).

Additionally, though FIG. 3 shows virtual stops 320(1) outside the operational range of the progressive mechanical stops 330 and virtual stops 320(2) inside the operational range of the progressive mechanical stops 330 embodiments of the disclosed subject matter are not so limited. For instance, both the virtual stop 320(2) and the virtual stop 320(1) can be inside the operational range of the corresponding progressive mechanical stop 330. Alternatively, both the virtual stop 320(1) and the virtual stop 320(2) can be outside the operational range of the corresponding progressive mechanical stop 330. The virtual stops 320 may be implemented symmetrically, such as shown in FIG. 3, or asymmetrically, for instance, based on operating characteristics of a particular machine 100, characteristics or habits of the operator of the machine 100, and/or characteristics of a particular worksite or task.

As shown in FIG. 3, the virtual stop 320(1) can be outside of the operational range of the corresponding progressive mechanical stop 330, though alternatively, the virtual stop 320(1) can be within the operational range of the corresponding progressive mechanical stop 330. According to one or more embodiments, the virtual stops 320(1) can represent initiation of a resistive force applied to the steering column 214 by the electric motor 220, and the virtual stops 320(2) can represent when a maximum resistive force is applied to the steering column 214 by the electric motor 220, for instance.

Optionally, the maximum resistive force from the electric motor 220 can prevent the steering column 214 from further movement toward a corresponding hard mechanical stop 332. Thus, in some instances, the maximum resistive force can set an absolute end stop for the steering column 214. Such absolute end stop may be referred to herein as a virtual end stop. The virtual end stop may be within the operational range of the progressive mechanical stop 330, such as shown in FIG. 3, or alternatively prior to reaching the operational range of the progressive mechanical stop 330. Limit, within the context of the second range of rotation 302, can mean applying the resistive force using the electric motor 220 but still allowing rotational movement of the steering column 214 toward the hard mechanical stop 332 and/or applying the resistive force using the electric motor 220 to prevent any further movement of the steering column 214 toward the hard mechanical stop 332, for instance, when the steering column 214 is at the virtual stop 320(2).

Focusing on the specific, non-limiting example set forth in FIG. 3, the hard mechanical stops 332 can define the first range of rotation 300, the virtual stops 320(2) can define the second range of rotation 302, and the virtual stops 320(1) can define the third range of rotation 304. As shown, the rotational position of the steering column 214 may be determined to be at a rotational position P1, for instance, based on the position signals 217 from the sensor 216.

At rotational position P1 of the steering column 214 (as determined based on the position signals 217 from the position sensor 216), a resistive force from the electric motor 220 may not be applied to the steering column 214. That is, the controller 218 may control the electric motor 220, via the control signals 221, such that the electric motor 220 does not apply the resistive force to the steering column 214. At the rotational position P1 the steering column 214 has not activated (e.g., engaged) either progressive mechanical stop 330.

As noted above, the virtual stop 320(1) can define ends of the third range of rotation 304 as a position at which the controller 218 can control the electric motor 220 to initially provide the resistive force to the steering column 214. Thus, the electric motor 220 can apply the resistive force when the steering column 214 is at rotational position P2, where the resistive force can be initiated at the virtual stop 320(1). The resistive force applied to the steering column 214 at rotational position P2 may be such that the steering column 214 is still allowed to be rotated toward the corresponding hard mechanical stop 332. Note also that in this particular example at the rotational position P2 the steering column 214 is not within the operational range of the progressive mechanical stop 330.

As shown in FIG. 3, the steering column 214 can continue moving toward the hard mechanical stop 332 and reach a rotational position P3, all the while under the resistive force of the electric motor 220 (which may be constant or increasing, for instance). At the rotational position P3 the progressive mechanical stop 330 can be active (e.g., engaged by the steering column 214). For instance, in the case of the progressive mechanical stop 330 in the form of a compliant member, a portion of the steering column 214 may be in contact with and compress the compliant member, which in response can provide a counter force (e.g., resistive force) to resist movement of the steering column 214 toward the hard mechanical stop 332. Upon initiation of the progressive mechanical stop 330, the resistive force applied by the electric motor 220 may continue increasing or may become constant or even decrease, for instance, since the progressive mechanical stop 330 is now also resisting movement of the steering column 214 toward the hard mechanical stop 332.

Virtual stop 320(2), as noted above, can be a position at which the electric motor 220 is controlled, in combination with the resistance provided by the progressive mechanical stop 330, to provide a resistive force to the steering column 214 to prevent further rotation of the steering column 214 toward the hard mechanical stop 332. Thus, the virtual stop 320(2) may be a virtual end stop past which the steering column 214 is prevented from rotating, and the steering column 214 can be prevented from moving past rotational position P3.

Though the virtual stops 320(2) are shown in FIG. 3 within the operational range of the progressive mechanical stops 330, as noted above, alternatively, the virtual stops 320(2) can be provided outside of the operational range of the progressive mechanical stops 330. In this alternative embodiment, the virtual stop 320(2) outside of the operational range of the progressive mechanical stop 330 may define the virtual end stop, or the end stop may still be defined somewhere within the operational range of the progressive mechanical stop 330 based on the combined resistive force applied by the progressive mechanical stop 330 and the electric motor 220.

Optionally, the virtual stops 320(1) and the virtual stops 320(2) can be set in advance. Alternatively, the virtual stops 320(1) and the virtual stops 320(2), per side, can be set only when the steering column 214 is determined to be within a predetermined rotational distance from the progressive mechanical stop 330 or a portion thereof, such as the hard mechanical stop 332. For instance, when the rotation position of the steering column 214 is on either side of a halfway mark in the first range of rotation the virtual stop 320(1) and the virtual stop 320(2) on that side may be set.

Virtual stops 320, including virtual stops 320(1) and virtual stops 320(2), can be stored in memory, such as memory 219 discussed above. The virtual stops 320 can be stored in advance and/or stored as part of a training or calibration operation for later retrieval during operation of the machine 100. The virtual stops 320 can be stored and/or created in correlation with various position-related characteristics of the steering column 214, such as angular or rotational position of the steering column 214, angular or rotational position of the steering column 214 with respect to one or more of the mechanical stops 230, speed of rotation of the steering column 214, rate of rotation of the steering column 214, and/or direction of rotation of the steering column 214. Thus, in one or more embodiments, the virtual stops 320 may be variable or vary, depending upon particular position-related characteristics of the steering column 214, such as one or more of the foregoing position-related characteristics. Varying, in this context, can mean that the resistance applied by the electric motor 220 to the steering column 214 upon reaching the virtual stop 320 may be different depending upon particular position-related characteristics of the steering column 214. Additionally or alternatively, varying can mean that where the virtual stop 320 occurs (e.g., is set) varies depending upon particular position-related characteristics of the steering column 214.

For example, when the steering column 214 is relatively close to one of the progressive mechanical stops 330 and the speed or acceleration of rotation of the steering column 214 is toward the progressive mechanical stop 330 is determined to be relatively high (e.g., compared against a predetermined threshold, for instance, stored in the memory 219), resistance provided by the electric motor 220 can start from a relatively high resistance upon the steering column 214 reaching the virtual stop 320(1) as compared to a situation where the steering column 214 is relatively far away from the progressive mechanical stop 330 and/or the speed or acceleration of rotation toward the progressive mechanical stop 330 is relatively low. As another example, when the speed or acceleration of rotation of the steering column 214 toward one of the progressive mechanical stops 330 is relatively high, the virtual stop 320(1) can be set such that the resistance applied by the electric motor 220 occurs relatively more quickly, effectively narrowing the innermost range of rotation (e.g., third range 304 or second range 302, depending upon whether one or two pairs of virtual stops 320(1), 320(2) are implemented).

Figure 4:
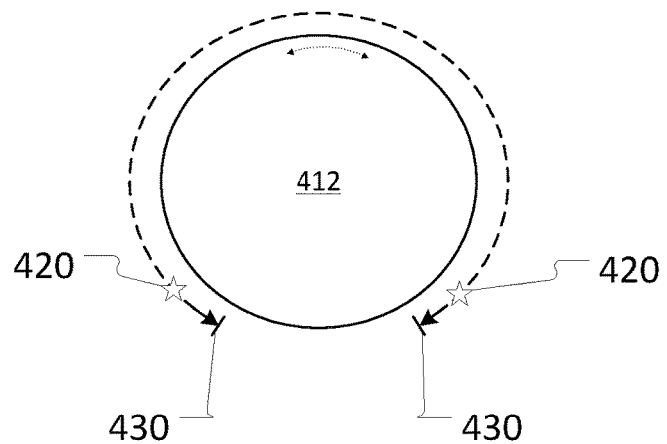
FIG. 4 is a diagrammatic representation showing rotational range limitations for a steering wheel based on stops according to one or more embodiments of the disclosed subject matter.

FIG. 4 is a diagrammatic representation showing rotational range limitations for a steering wheel 412 as a control interface, which may be rotated clockwise and counterclockwise, implemented with stops according to one or more embodiments of the disclosed subject matter. Notably, the rotational range of the steering wheel 412 may be defined according to the mechanical stops 430, particularly hard mechanical stops thereof (not expressly shown). Moreover, virtual stops 420 may be set within the rotational range provided by the mechanical stops 430. When the steering wheel 412 is being turned in a direction toward one of the mechanical stops 430 and it at or between the corresponding virtual stop 420 and the one of the mechanical stops 430, a counter resistive force may be applied to provide torque feedback to the steering wheel 412. Such counter resistive force may be applied to the steering column by an electric motor operatively coupled to the steering column, and under the control of a controller, and felt at the steering wheel 412 as torque feedback. Though FIG. 4 shows only a single virtual stop 420 associated with each mechanical stop 430, as noted above, more than one virtual stop 420 may be associated with each mechanical stop 430, including, optionally, when the mechanical stop 430 in the form of a progressive mechanical stop is activated or in contact with the steering column.

INDUSTRIAL APPLICABILITY

As noted above, the present disclosure relates to electrohydraulic (EH) steering systems that provide or implement at least one virtual stop and mechanical stop pairing.

For steering input in steer-by-wire systems it may be desirable to provide feedback to an operator to indicate an end position and/or an indication that the end position is upcoming. It may also be desirable to provide a mechanical stop in the form of a progressive mechanical stop. Such feedback and progressive mechanical stop can be useful to reduce or eliminate metal-to-metal contact of the steering column when the steering column is rotated to its rotational limits. Thus, embodiments of the disclosed subject matter may be characterized as a hybrid system that uses a mechanical stop in the form of a progressive mechanical stop in combination with torque feedback provided via operation of an electric motor. Such hybrid system can minimize the amount of rotational angle consumed by the progressive mechanical stop (i.e., minimize the amount of limit to the angular rotation of the steering column) while at the same time providing a supplement to the progressive mechanical stop by way of a torque feedback system that applies a resistive force from an electric motor to the steering column. Put another way, embodiments of the disclosed subject matter can implement progressive mechanical stops in combination with electrical motor-based torque feedback to provide sufficient tactile feedback without unduly limiting or consuming angular rotation of the steering column.

Figure 5:
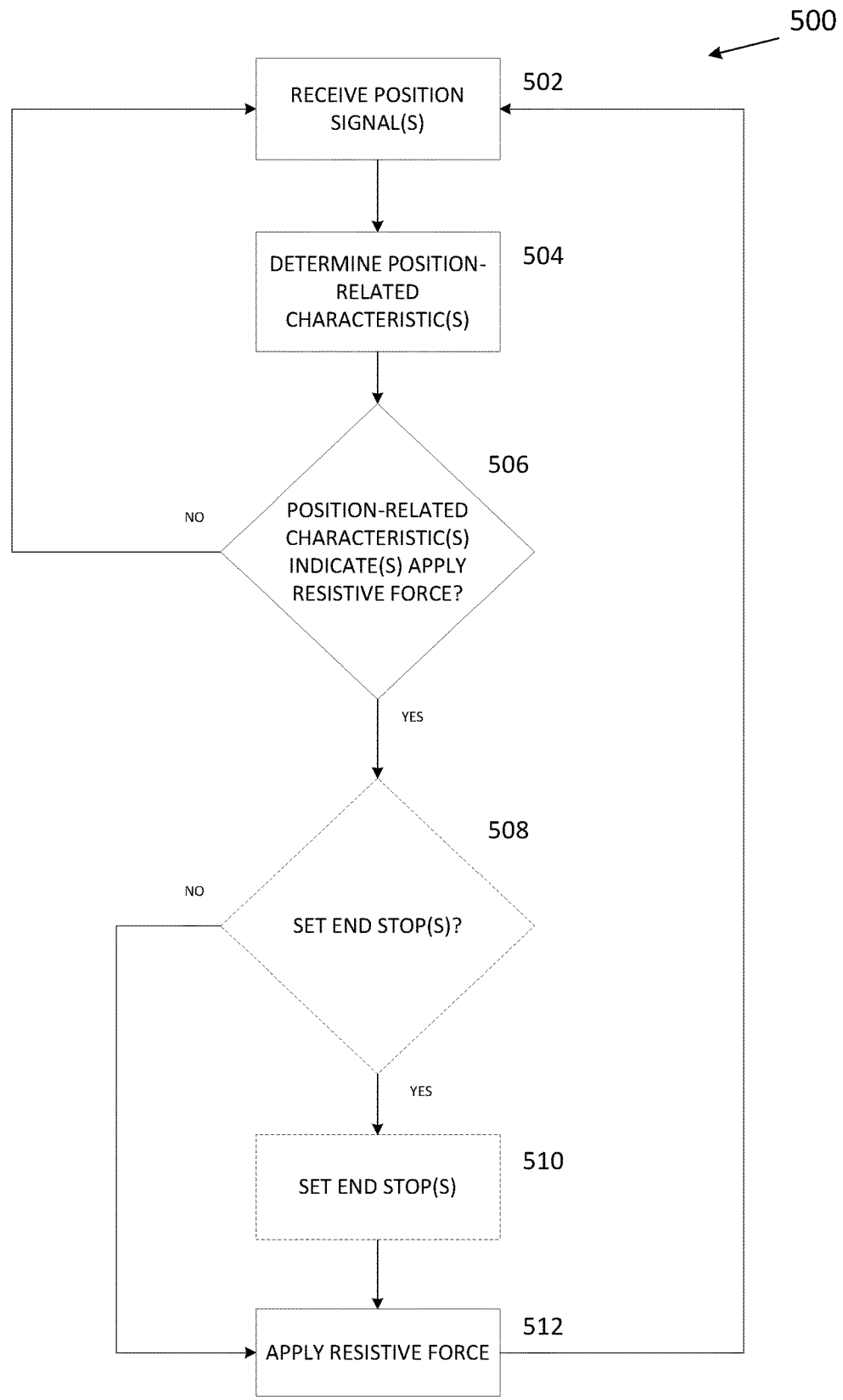
FIG. 5 is a flow chart of a method according to one or more embodiments of the disclosed subject matter.

Turning to FIG. 5, FIG. 5 is a flow chart of a method 500 according to one or more embodiments of the disclosed subject matter.

The method 500 can be performed by a steering system, such as steering system 200 of FIG. 2. A controller, such as controller 218, can perform or control some or all of the operations of the method 500. Additionally, the method 500 may be performed according to a non-transitory computer-readable storage medium, such as memory 219, that stores computer-readable instructions that, when executed by a computer (e.g., a processor or microprocessor of controller 218), cause the computer to perform the method 500.

At 502 position signals, such as position signals 217, can be received. Such position signals 217 can be received by the controller 218, for instance, from one or more sensors, such as sensor 216. As noted above, the position signals 217 can correspond to rotational position of a steering column, such as steering column 214.

At 504 at least one position-related characteristic of the steering column 214 can be determined based on the received position signals 217. The controller 218 can process the position signals 217 to determine the at least one of the steering column 214. As noted above, position-related characteristics can include angular or rotational position of the steering column 214, angular or rotational position of the steering column 214 with respect to one or more of the mechanical stops 230, rotation speed of the steering column 214, rotational acceleration of the steering column 214, and/or direction of rotation of the steering column 214.

At 506 the method 500 can determine whether the at least one position-related characteristic indicates that a resistive force is to be applied to the steering column 214. The controller 218 can perform processing to determine whether the at least one position-related characteristic indicates that the resistive force is to be applied to the steering column 214. Such processing can include comparing the determined position of the steering column 214 relative to one or more mechanical stops 230, such as progressive mechanical stops 330 (or portions thereof), and/or one or more virtual stops 320, such as virtual stops 320(1) and/or 320(2). The processing may also factor in as position-related characteristics the determined rotational speed, rotational acceleration, and/or rotational direction of the steering column 214.

In that the determining of whether to apply the resistive force can be based on one or more virtual stops 320, such as virtual stops 320(1) and virtual stops 320(2) of FIG. 3, the one or more virtual stops 320 can be stored in memory, such as memory 219 of FIG. 2. The memory 219 can store, in a lookup table, for instance, the one or more virtual stops (e.g., virtual end stops) 320 to selectively control application of the resistive force by the electric motor 220. Such virtual stops 320 can be stored in correlation with various position-related characteristics of the steering column 214, such as angular or rotational position of the steering column 214, angular or rotational position of the steering column 214 with respect to one or more of the mechanical stops 230, rotation speed of the steering column 214, rotational acceleration of the steering column 214, and/or direction of rotation of the steering column 214, and can be accessed by the controller 218 to control the electric motor 220 to apply the resistive force to the steering column 214.

If by the processing of the at least one position-related characteristic it is determined that the resistive force is not to be applied, for instance, because the steering column 214 is within a rotational range (e.g., the third rotational range 304) where no resistive force is needed, control can return to 502. On the other hand, if by the processing of the at least one position-related characteristic it is determined that the resistive force is to be applied, at 512 the resistive force can be applied to the steering column 214. The controller 218 can control an electric motor, such as electric motor 220, to apply the resistive force to the steering column 214. Application of the resistive force can be initiated from a first state where the electric motor 220 does not apply any resistive force to the steering column 214 to a second state where the electric motor 220 applies the resistive force to the steering column 214. As non-limiting examples, application of the resistive force can increase after initiation, for instance, linearly or exponentially, as the steering column 214 is moved toward a mechanical stop, such as mechanical stop 230; the resistive force can remain constant, for instance, when the steering column 214 remains at the same position; and the resistive force can decrease (after initiation) and ultimately stop being applied to the steering column 214 when the steering column 214 is moved away from the mechanical stop 230.

Application of the resistive force to the steering column 214 can be based on the determined position of the steering column 214 relative to one or more mechanical stops 230, one or more virtual stops 320, and/or other position-related characteristics including rotational speed, rotational acceleration, and rotational direction of the steering column 214.

In a case where one or more virtual stops 320 may not be set in advance, the method 500 can optionally perform a dynamic setting of the one or more virtual stops 320 responsive to the at least one position-related characteristic indicating that the resistive force is to be applied and based on the actual determined at least one position-related characteristic.

In particular, at 508 the method 500 can determine whether one or more virtual stops 320 are to be dynamically set. When the method 500 includes the dynamic setting of the one or more virtual stops 320, at 510 the one or more virtual stops 320 can be set based on various position-related characteristics of the steering column 214, such as angular or rotational position of the steering column 214, angular or rotational position of the steering column 214 with respect to one or more of the mechanical stops 230, speed of rotation of the steering column 214, rotational acceleration of the steering column 214, and/or direction of rotation of the steering column 214. Application of the resistive force to the steering column 214 by the electric motor 220 can be implemented at 512, under control of the controller 218, based on the dynamically set virtual stop(s) 320 and the various position-related characteristics of the steering column 214.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A steering system for a working machine comprising:
a control interface to receive an input to control steering of the working machine;
a steering column operatively coupled to the control interface and a steering assembly to control steering of the working machine based on the input;
a progressive mechanical stop operatively coupled to the steering column to mechanically limit rotation of the steering column to a first range of rotation;
an electric motor operatively coupled to the steering column to apply a resistive force to the steering column;
at least one position sensor operatively coupled to the steering column to signal rotational position of the steering column; and
a controller operatively coupled to the electric motor and the at least one position sensor to output control signals to the electric motor to apply the resistive force to the steering column based on the rotational position of the steering column,
wherein the controller, via the control signals to the electric motor, provides virtual end stops to further limit rotation of the steering column to a second range of rotation within the first range of rotation, and
wherein the electric motor applies the resistive force to the steering column from a state where no resistive force is applied to the steering column responsive to the control signals.

2. The steering system according to claim 1, wherein the controller outputs the control signals to the electric motor to begin applying the resistive force to the steering column when the rotational position of the steering column reaches a predetermined position defining a third range of rotation within the second range of rotation.

3. The steering system according to claim 1,
wherein the controller determines a rotation speed of the steering column based on the signals output from the at least one position sensor, and
wherein the controller outputs the control signals to the electric motor to apply the resistive force such that an amount of resistive force applied to the steering column is applied as a function of the determined rotation speed.

4. The steering system according to claim 1, wherein the resistive force applied by the electric motor one of linearly increases or non-linearly increases toward one of the virtual end stops.

5. The steering system according to claim 1,
wherein the controller determines a rotation speed of the steering column based on the signals output from the at least one position sensor, and
wherein the controller sets at least one of the virtual end stops based on the determined rotation speed.

6. The steering system according to claim 1, wherein the resistive force applied to the steering column is constant from initiation to each of the virtual end stops.

7. The steering system according to claim 1, wherein the virtual end stops are variable based on a determined rotation speed of the steering column.

8. The steering system according to claim 1,
wherein the control interface is in the form of a steering wheel,
wherein the first range of rotation is less than or equal to three hundred sixty degrees, and
wherein the progressive mechanical stop is one or more of a spring, an increased resistance mechanical configuration, and a compliant member provided on the steering column and/or an assembly thereof.

9. The steering system according to claim 1, wherein the second range of rotation begins when the steering column is at a position contacting the progressive mechanical stop.

10. A steering method comprising:
receiving, using a processor, position signals associated with rotational position of a steering column, the steering column having a mechanical stop operatively coupled to the steering column to mechanically limit rotation of the steering column to a first range of rotation;
determining, using the processor, at least one position-related characteristic of the steering column based on the received position signals;
determining, using the processor, that the determined at least one position-related characteristic indicates that a resistive force is to be applied to the steering column; and
controlling, using the processor, operation of an electric motor to apply the resistive force to the steering column responsive to said determining that the determined at least one position-related characteristic indicates that the resistive force is to be applied to the steering column,
wherein the mechanical stop is a progressive mechanical stop, and
wherein the method further comprises setting a virtual stop for the steering column associated with initiating a predetermined amount of resistive force applied to the steering column by the electric motor when rotation of the steering column reaches the virtual stop responsive to said determining that the determined at least one position-related characteristic indicates that the resistive force is to be applied to the steering column.

11. The steering method according to claim 10, wherein said controlling operation of the electric motor to apply the resistive force to the steering column implements the virtual stop to initiate the application of the resistive force and a virtual end stop to apply the resistive force such that further rotation of the steering column toward the progressive mechanical stop is prevented.

12. The steering method according to claim 10, wherein said determining that the determined at least one position-related characteristic indicates that the resistive force is to be applied to the steering column is based on, relative to the progressive mechanical stop, a determined rotational position of the steering column, a determined rotation speed of the steering column, and a determined direction of rotation of the steering column.

13. The steering method according to claim 10, wherein said controlling operation of the electric motor to apply the resistive force to the steering column includes transitioning from a first state where the electric motor applies no resistive force to the steering column to a second state where the electric motor applies the resistive force to the steering column.

14. The steering method according to claim 10,
wherein the at least one position-related characteristic is a rotation speed of the steering column toward the mechanical stop rotational distance of the steering column from the mechanical stop.

15. The steering method according to claim 10, wherein said controlling operation of the electric motor to apply the resistive force to the steering column is initiated in an operational range of the progressive mechanical stop.

16. The steering method according to claim 10, wherein said controlling operation of the electric motor to apply the resistive force to the steering column includes increasing the resistive force when the steering column is moved toward the progressive mechanical stop, reducing the resistive force when the steering column is moved away from the progressive mechanical stop, and stopping the resistive force responsive to a determination that the determined at least one position-related characteristic indicates that the resistive force is not to be applied to the steering column.

17. A non-transitory computer-readable storage medium storing computer-readable instructions that, when executed by a computer, cause the computer to perform a steering method comprising:
determining a plurality of position-related characteristics of a steering column of a working machine, the plurality of position-related characteristics including rotational positioning of the steering column and rotation speed of the steering column;
dynamically setting a virtual stop to limit rotation of the steering column based on said determining the plurality of position-related characteristics of the steering column, the steering column having a progressive mechanical stop operatively provided to mechanically limit rotation of the steering column past the virtual stop; and
implementing the dynamically set virtual stop by applying a resistive force to the steering column via control of an electric motor when the steering column is at a position within an operational range of the progressive mechanical stop.

18. The non-transitory computer-readable storage medium according to claim 17, wherein said dynamically setting the virtual stop includes accessing a lookup table that correlates a plurality of virtual stops, including said dynamically set virtual stop, to the rotational positioning of the steering column and/or the rotation speed of the steering column.

19. The non-transitory computer-readable storage medium according to claim 17, wherein the dynamically set virtual stop is a virtual end stop, and
    wherein said implementing the dynamically set virtual end stop includes initiating application of the resistive force to the steering column prior to the steering column reaching the dynamically set virtual end stop.

20. The non-transitory computer-readable storage medium according to claim 17, wherein the dynamically set virtual stop is a virtual end stop, and
    wherein said dynamically setting the virtual end stop includes setting an amount of the resistive force to be applied to the steering column up to and at the dynamically set virtual end stop in correspondence with the determined rotation speed of the steering column.

\* \* \* \* \*